(12) United States Patent
Gau et al.

(10) Patent No.: US 10,727,897 B2
(45) Date of Patent: Jul. 28, 2020

(54) NON-ORTHOGONAL MULTIPLE ACCESS WIRELESS COMMUNICATIONS METHODS AND APPARATUS THEREOF

(71) Applicant: MediaTek Inc., Hsinchu (TW)

(72) Inventors: Guo-Hau Gau, Hsinchu County (TW); Ho-Chi Huang, Hsinchu County (TW); Wei-Jen Chen, Taipei (TW); Chiou-Wei Tsai, Yunlin County (TW); Ju-Ya Chen, Kaohsiung (TW); Mau-Lin Wu, Hsinchu (TW)

(73) Assignee: MediaTek Inc., Hsinchu (TW)

(*) Notice: Subject to any disclaimer, the term of this patent is extended or adjusted under 35 U.S.C. 154(b) by 0 days.

(21) Appl. No.: 15/674,498

(22) Filed: Aug. 10, 2017

(65) Prior Publication Data

US 2018/0048348 A1 Feb. 15, 2018

Related U.S. Application Data

(60) Provisional application No. 62/373,383, filed on Aug. 11, 2016.

(51) Int. Cl.
*H04B 1/69* (2011.01)
*H04W 72/04* (2009.01)
*H04L 5/00* (2006.01)

(52) U.S. Cl.
CPC .............. *H04B 1/69* (2013.01); *H04L 5/0016* (2013.01); *H04L 5/0037* (2013.01); *H04W 72/0446* (2013.01); *H04W 72/0453* (2013.01)

(58) Field of Classification Search
CPC ....... H04B 1/69; H04L 5/0037; H04L 5/0016; H04W 72/0446; H04W 72/0453
See application file for complete search history.

(56) References Cited

U.S. PATENT DOCUMENTS

| | | | |
|---|---|---|---|
| 9,942,008 B1* | 4/2018 | Sun | H04L 1/1887 |
| 2010/0232535 A1* | 9/2010 | Yue | H04L 1/0048 375/267 |
| 2011/0280261 A1* | 11/2011 | Varadarajan | H04L 27/20 370/475 |
| 2016/0353446 A1 | 12/2016 | Abdoli et al. | |
| 2017/0033832 A1* | 2/2017 | Dang | H04L 1/00 |
| 2019/0029031 A1* | 1/2019 | Kumar | H04L 5/003 |

OTHER PUBLICATIONS

European Patent Office, European Search Report for European Patent Application No. 18161107, dated Aug. 14, 2018.
(Continued)

*Primary Examiner* — Marcus Hammonds
(74) *Attorney, Agent, or Firm* — Han IP PLLC; Andy M. Han

(57) ABSTRACT

Various novel concepts and schemes pertaining to non-orthogonal multiple access for wireless communications are described. A group orthogonal coded access (GOCA) scheme is introduced to reduce multi-user interference (MUI) and improve performance. A repetition division multiple access (RDMA) scheme is introduced to differentiate user equipment (UEs) by different repetition patterns. A low-density spreading (LDS) scheme is introduced to reduce MUI and improve performance.

4 Claims, 11 Drawing Sheets

(56) References Cited

OTHER PUBLICATIONS

Mediatek Inc., "New uplink non-orthogonal multiple access schemes for NR", 3GPP Draft; R1-167535, Aug. 21, 2016, Gothenburg, Sweden.
Kim Nam I et al., "Hybrid Multiple Access System Based on Non Orthogonality and Sparse Code", 2017 IEEE Wireless Communications and Networking Conference (WCNC), IEEE, Mar. 19, 2017.
Liu, Lihai et al.; Analysis and Optimization of CDMA Systems With Chip-Level Interleavers; IEEE Journal on Selected Areas in Communications, vol. 24, No. 1, Jan. 2006.

* cited by examiner

UE 1

Cyclic Shifts: s1 = (0, 3, 6)

Repetition Pattern:
 p1 = s1 − s1 = (0, 0, 0)

| $X_1(1)$ | $X_1(10)$ | $X_1(19)$ | $X_1(25)$ | $X_1(7)$ | $X_1(16)$ | $X_1(22)$ | $X_1(4)$ | $X_1(13)$ |
|---|---|---|---|---|---|---|---|---|
| $X_1(2)$ | $X_1(11)$ | $X_1(20)$ | $X_1(26)$ | $X_1(8)$ | $X_1(17)$ | $X_1(23)$ | $X_1(5)$ | $X_1(14)$ |
| $X_1(3)$ | $X_1(12)$ | $X_1(21)$ | $X_1(27)$ | $X_1(9)$ | $X_1(18)$ | $X_1(24)$ | $X_1(6)$ | $X_1(15)$ |
| $X_1(4)$ | $X_1(13)$ | $X_1(22)$ | $X_1(1)$ | $X_1(10)$ | $X_1(19)$ | $X_1(25)$ | $X_1(7)$ | $X_1(16)$ |
| $X_1(5)$ | $X_1(14)$ | $X_1(23)$ | $X_1(2)$ | $X_1(11)$ | $X_1(20)$ | $X_1(26)$ | $X_1(8)$ | $X_1(17)$ |
| $X_1(6)$ | $X_1(15)$ | $X_1(24)$ | $X_1(3)$ | $X_1(12)$ | $X_1(21)$ | $X_1(27)$ | $X_1(9)$ | $X_1(18)$ |
| $X_1(7)$ | $X_1(16)$ | $X_1(25)$ | $X_1(4)$ | $X_1(13)$ | $X_1(22)$ | $X_1(1)$ | $X_1(10)$ | $X_1(19)$ |
| $X_1(8)$ | $X_1(17)$ | $X_1(26)$ | $X_1(5)$ | $X_1(14)$ | $X_1(23)$ | $X_1(2)$ | $X_1(11)$ | $X_1(20)$ |
| $X_1(9)$ | $X_1(18)$ | $X_1(27)$ | $X_1(6)$ | $X_1(15)$ | $X_1(24)$ | $X_1(3)$ | $X_1(12)$ | $X_1(21)$ |

UE 2

Cyclic Shifts: s2 = (0, 4, 5)

Repetition Pattern:
 p2 = s2 − s1 = (0, +1, −1)

| $X_2(1)$ | $X_2(10)$ | $X_2(19)$ | $X_2(24)$ | $X_2(6)$ | $X_2(15)$ | $X_2(23)$ | $X_2(5)$ | $X_2(14)$ |
|---|---|---|---|---|---|---|---|---|
| $X_2(2)$ | $X_2(11)$ | $X_2(20)$ | $X_2(25)$ | $X_2(7)$ | $X_2(16)$ | $X_2(24)$ | $X_2(6)$ | $X_2(15)$ |
| $X_2(3)$ | $X_2(12)$ | $X_2(21)$ | $X_2(26)$ | $X_2(8)$ | $X_2(17)$ | $X_2(25)$ | $X_2(7)$ | $X_2(16)$ |
| $X_2(4)$ | $X_2(13)$ | $X_2(22)$ | $X_2(27)$ | $X_2(9)$ | $X_2(18)$ | $X_2(26)$ | $X_2(8)$ | $X_2(17)$ |
| $X_2(5)$ | $X_2(14)$ | $X_2(23)$ | $X_2(1)$ | $X_2(10)$ | $X_2(19)$ | $X_2(27)$ | $X_2(9)$ | $X_2(18)$ |
| $X_2(6)$ | $X_2(15)$ | $X_2(24)$ | $X_2(2)$ | $X_2(11)$ | $X_2(20)$ | $X_2(1)$ | $X_2(10)$ | $X_2(19)$ |
| $X_2(7)$ | $X_2(16)$ | $X_2(25)$ | $X_2(3)$ | $X_2(12)$ | $X_2(21)$ | $X_2(2)$ | $X_2(11)$ | $X_2(20)$ |
| $X_2(8)$ | $X_2(17)$ | $X_2(26)$ | $X_2(4)$ | $X_2(13)$ | $X_2(22)$ | $X_2(3)$ | $X_2(12)$ | $X_2(21)$ |
| $X_2(9)$ | $X_2(18)$ | $X_2(27)$ | $X_2(5)$ | $X_2(14)$ | $X_2(23)$ | $X_2(4)$ | $X_2(13)$ | $X_2(22)$ |

UE 3

Cyclic Shifts: s3 = (0, 2, 7)

Repetition Pattern:
 p3 = s3 − s1 = (0, −1, +1)

| $X_3(1)$ | $X_3(10)$ | $X_3(19)$ | $X_3(26)$ | $X_3(8)$ | $X_3(17)$ | $X_3(21)$ | $X_3(3)$ | $X_3(12)$ |
|---|---|---|---|---|---|---|---|---|
| $X_3(2)$ | $X_3(11)$ | $X_3(20)$ | $X_3(27)$ | $X_3(9)$ | $X_3(18)$ | $X_3(22)$ | $X_3(4)$ | $X_3(13)$ |
| $X_3(3)$ | $X_3(12)$ | $X_3(21)$ | $X_3(1)$ | $X_3(10)$ | $X_3(19)$ | $X_3(23)$ | $X_3(5)$ | $X_3(14)$ |
| $X_3(4)$ | $X_3(13)$ | $X_3(22)$ | $X_3(2)$ | $X_3(11)$ | $X_3(20)$ | $X_3(24)$ | $X_3(6)$ | $X_3(15)$ |
| $X_3(5)$ | $X_3(14)$ | $X_3(23)$ | $X_3(3)$ | $X_3(12)$ | $X_3(21)$ | $X_3(25)$ | $X_3(7)$ | $X_3(16)$ |
| $X_3(6)$ | $X_3(15)$ | $X_3(24)$ | $X_3(4)$ | $X_3(13)$ | $X_3(22)$ | $X_3(26)$ | $X_3(8)$ | $X_3(17)$ |
| $X_3(7)$ | $X_3(16)$ | $X_3(25)$ | $X_3(5)$ | $X_3(14)$ | $X_3(23)$ | $X_3(27)$ | $X_3(9)$ | $X_3(18)$ |
| $X_3(8)$ | $X_3(17)$ | $X_3(26)$ | $X_3(6)$ | $X_3(15)$ | $X_3(24)$ | $X_3(1)$ | $X_3(10)$ | $X_3(19)$ |
| $X_3(9)$ | $X_3(18)$ | $X_3(27)$ | $X_3(7)$ | $X_3(16)$ | $X_3(25)$ | $X_3(2)$ | $X_3(11)$ | $X_3(20)$ |

400 rep_mod = [ 0  0  0;
            0  0 -1;
            0  1  1;
            1 -1 -1;
           -1 -2 -2;
           -1  2 -2;
            1  2  2;
           -1 -2  3;
            2  2 -3;
           -2  2  3;
           -2  3  3;
            3 -3 -3;
           -3  3 -4;
            3 -4  4;
           -3  4  4;
            4 -4 -4]

RDMA PATTERN OF
2X REPETITION rep_mod = [ 0  0  0;
            0  0 -1;
            0  1  1;
            1 -1 -2;
           -1 -2 -1;
           -2  0  3;
           -2  3  0;
           -3  0  4;
           -3  4  0;
            4 -5 -5;
            4 -1  0;
           -5  5  5;
           -5  1 -6;
            6 -6 -6;
            7  1  1;
           -7  1 -7]

RDMA PATTERN OF
3X REPETITION rep_mod = [ 0  0  0  0;
            0  0  1 -1;
            0  2 -1  1;
           -1 -2 -2 -1;
           -1  0 -1 -2;
           -3  2  3 -1;
            2 -1  4 -2;
           -4 -3  0  1;
           -3 -6  6  3;
           -5  3 -2 -2;
            6  2 -3 -7;
            6 -7 -2  1;
           -6  3  4  7;
            8 -8 -3 -3;
           -8  8 -9  2;
            9 -3 -9  3]

RDMA PATTERN OF
4X REPETITION

NON-ORTHOGONAL MULTIPLE ACCESS WIRELESS COMMUNICATIONS METHODS AND APPARATUS THEREOF

CROSS REFERENCE TO RELATED PATENT APPLICATION(S)

The present disclosure claims the priority benefit of U.S. Provisional Patent Application No. 62/373,383, filed 11 Aug. 2016, the content of which is incorporated by reference in its entirety.

TECHNICAL FIELD

The present disclosure is generally related to wireless communications and, more particularly, to non-orthogonal multiple access for wireless communications.

BACKGROUND

Unless otherwise indicated herein, approaches described in this section are not prior art to the claims listed below and are not admitted as prior art by inclusion in this section.

Non-orthogonal multiple access (NOMA) may be a technology beneficial for supporting a massive number of user equipment (UE) requesting intermitting transmissions of small data packets in $5^{th}$-Generation (5G) massive machine type communication (mMTC) and two-step random-access channel (RACH) applications. In the $3^{rd}$ Generation Partnership Project (3GPP) 5G New Radio (NR) study item phase, a variety of NOMA schemes were proposed and discussed, including resource spreading multiple access (RSMA), non-orthogonal coded access (NOCA), interleave division multiple access (IDMA), and interleaved-grid multiple access (IGMA). Certain observations are captured in the 3GPP technical report. The proposed NOMA schemes for uplink (UL) transmissions share the following common features: (1) using multiple access (MA) feature(s) at the transmitter side, and (2) allowing multi-user detector at the receiver side. The proposed NOMA schemes for UL transmissions on a high level follow a basic diagram as that depicted in FIG. 11, including bit-level operations and symbol-level operations.

Under RSMA, multiple UEs are differentiated by scrambling sequences. While this technique allows for simple sequence generation, the performance is relatively poor. Under IDMA, multiple UEs are differentiated by interleave patterns. While this technique allows for better utilization of diversity, a system implementing IDMA would likely be associated with higher complexity. Under IGMA, multiple UEs are differentiated based on different bit-level interleavers, different grid mapping patterns, and different combinations of bit-level interleavers and grid mapping patterns. While this technique allows for more flexibility, a system implementing IGMA would likely be associated with higher complexity.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose various novel concepts and schemes pertaining to NOMA wireless communications. Specifically, the present disclosure provides schemes, or proposed solutions, that provide NOMA wireless communications without aforementioned issues.

In one aspect, a method may involve a processor of a UE of a first group of UEs of multiple groups encoding data for NOMA. The encoding may involve spreading the data into shared resources using a multi-stage sequence generation process. The method may also involve the processor transmitting the encoded data to a wireless receiver.

In one aspect, a method may involve a processor of a UE of a plurality of UEs encoding data for NOMA. The encoding may involve spreading the data into shared resources using a repetition pattern of a plurality of data pieces of the data. The method may also involve the processor transmitting the encoded data to a wireless receiver.

In one aspect, a method may involve a processor of a UE of a plurality of UEs encoding data for NOMA. The encoding may involve spreading the data into shared resources using a low-density spreading (LDS) pattern which is less than an entire pattern of the shared resources. The method may also involve the processor transmitting the encoded data to a wireless receiver.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 3 is a diagram of a second example scheme in accordance with an implementation of the present disclosure.

FIG. 4 is a diagram of an example of repetition patterns in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Various novel concepts and schemes pertaining to NOMA wireless communications in accordance with the present disclosure includes a group orthogonal coded access (GOCA) scheme to reduce multi-user interference (MUI) and improve performance. Various novel concepts and schemes pertaining to NOMA wireless communications in accordance with the present disclosure also includes a repetition division multiple access (RDMA) scheme to differentiate UEs by different repetition patterns. Various novel concepts and schemes pertaining to NOMA wireless communications in accordance with the present disclosure further includes a low-density spreading (LDS) scheme to reduce MUI and improve performance.

Detailed description of the GOCA scheme, the RDMA scheme and the LDS scheme is provided below with reference to FIG. 1-FIG. 6.

Figure 1:
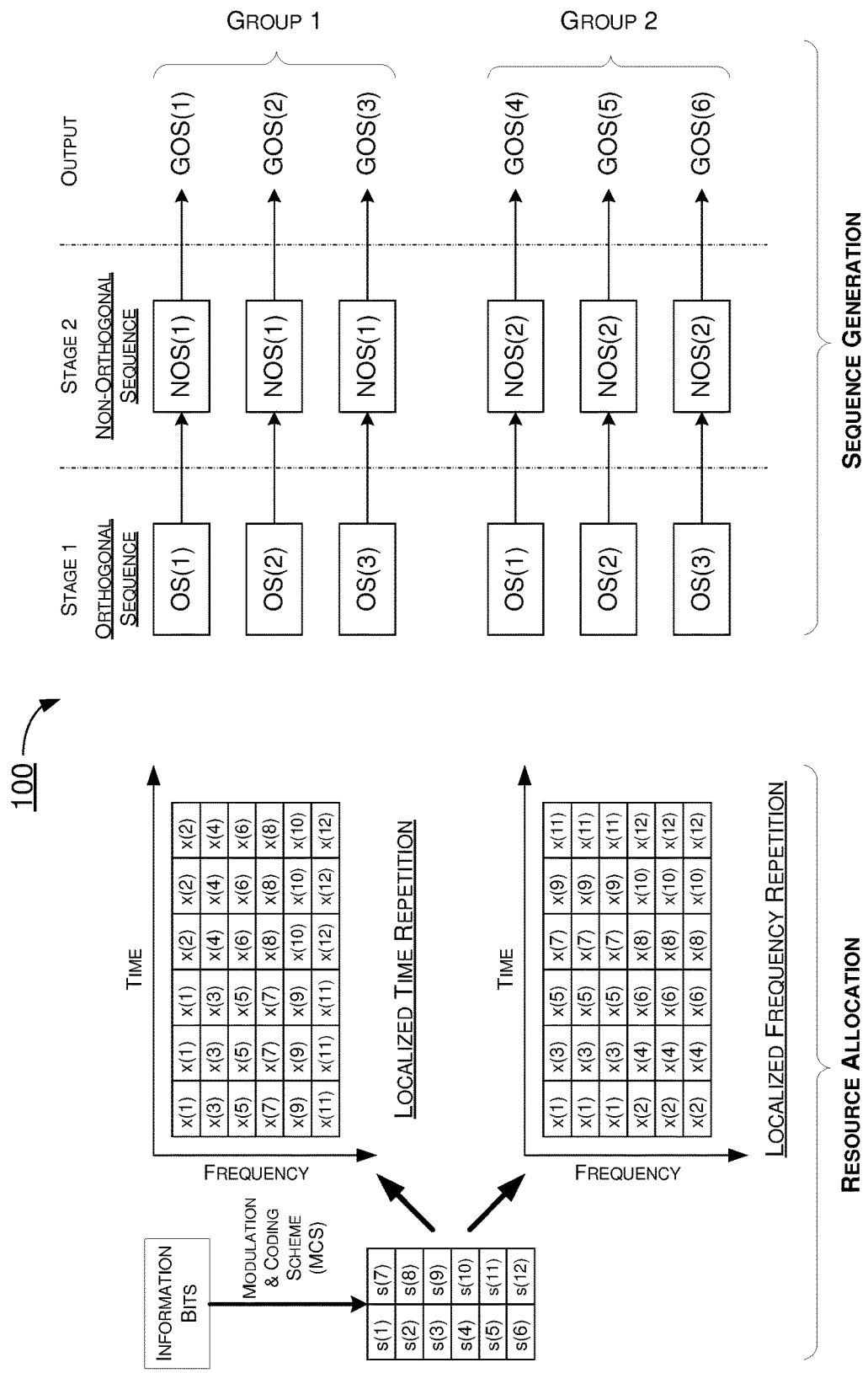
FIG. 1 is a diagram of a first example scheme in accordance with an implementation of the present disclosure.

FIG. 1 illustrates an example GOCA scheme 100 in accordance with an implementation of the present disclosure.

Under the GOCA scheme 100, a UE may use a multi-stage sequence structure to spread data into shared time and frequency resources. For each stage, a coding sequence may be orthogonal or non-orthogonal. Moreover, under the GOCA scheme 100, multiple UEs may be divided into several groups with each group having more than one UE, and the UEs belonging to a same group may use different coding sequences for a first stage while using a same coding sequence for subsequent stages. That is, for UEs of the same group, different and orthogonal coding sequences may be used in a first stage. For each subsequent stage of the multiple stages, a respective nonorthogonal coding sequence may be used for all the UEs in that group. For simplicity and ease of understanding, a two-stage example is illustrated in FIG. 1 although the GOCA scheme 100 can be implemented in more than two stages.

Referring to FIG. 1, under the GOCA scheme 100, composite coding sequences may be generated in a two-stage sequence generation process. Each composite coding sequence may be multiplied with source symbols of a respective UE to generate complex symbols. In the first stage (denoted as "stage 1" in FIG. 1), different orthogonal coding sequences may be used for each group. In the second stage (denoted as "stage 2" in FIG. 1), a non-orthogonal coding sequence may be used for each group. In the example shown in FIG. 1, three UEs are in each of two groups of UEs, namely Group 1 and Group 2. A resultant composite coding sequence for a first UE in Group 1 (denoted as "GOS(1)" in FIG. 1) may be generated as a result of multiplication of a first orthogonal coding sequence (denoted as "OS(1)" in FIG. 1) and a first non-orthogonal coding sequence (denoted as "NOS(1)" in FIG. 1). A resultant composite coding sequence for a second UE in Group 1 (denoted as "GOS(2)" in FIG. 1) may be generated as a result of multiplication of a second orthogonal coding sequence (denoted as "OS(2)" in FIG. 1) and the first non-orthogonal coding sequence (denoted as "NOS(1)" in FIG. 1). A resultant composite coding sequence for a third UE in Group 1 (denoted as "GOS(3)" in FIG. 1) may be generated as a result of multiplication of a third orthogonal coding sequence (denoted as "OS(3)" in FIG. 1) and the first non-orthogonal coding sequence (denoted as "NOS(1)" in FIG. 1).

Similarly, a resultant composite coding sequence for a first UE in Group 2 (denoted as "GOS(4)" in FIG. 1) may be generated as a result of multiplication of the first orthogonal coding sequence (denoted as "OS(1)" in FIG. 1) and a second non-orthogonal coding sequence (denoted as "NOS(2)" in FIG. 1). A resultant composite coding sequence for a second UE in Group 2 (denoted as "GOS(5)" in FIG. 1) may be generated as a result of multiplication of the second orthogonal coding sequence (denoted as "OS(2)" in FIG. 1) and the second non-orthogonal coding sequence (denoted as "NOS(2)" in FIG. 1). A resultant composite coding sequence for a third UE in Group 2 (denoted as "GOS(6)" in FIG. 1) may be generated as a result of multiplication of the third orthogonal coding sequence (denoted as "OS(3)" in FIG. 1) and the second non-orthogonal coding sequence (denoted as "NOS(2)" in FIG. 1).

Thus, for the UEs within each group, the composite coding sequences are orthogonal to one another since each composite coding sequence is a product of a different orthogonal coding sequence. That is, in Group 1, the OS(1) used in generating GOS(1), the OS(2) used in generating GOS(2), and the OS(3) used in generating GOS(3) are different and orthogonal to one another. Likewise, in Group 2, the OS(1) used in generating GOS(4), the OS(2) used in generating GOS(5), and the OS(3) used in generating GOS (6) are different and orthogonal to one another. Accordingly, a first composite coding sequence for a first UE is orthogonal to a second composite coding sequence of a second UE in the same group. Moreover, the composite coding sequence of a UE in one group is different from the composite coding sequence of another UE in another group. This is because different non-orthogonal coding sequences are used for the groups. In particular, NOS(1) is used to generate GOS(1), GOS(2) and GOS(3) for Group 1, and NOS(2) is used to generate GOS(4), GOS(5) and GOS(6) for Group 2. Advantageously, multi-user interference may be reduced while performance may be improved.

Moreover, under the GOCA scheme 100, time resources and frequency resources, which are shared resources, may be allocated with localized time repetition or localized frequency repetition. Referring to FIG. 1, information bits for transmission may be processed through a modulation and coding scheme (MCS) into a number of source symbols. In the example shown in FIG. 1, the process of MCS produces twelve source symbols (denoted as s(1), s(2), s(3), s(4), s(5), s(6), s(7), s(8), s(9), s(10), s(11) and s(12) in FIG. 1).

Under the GOCA scheme 100, encoded copies of the source symbols may be allocated to shared time and frequency resources repeatedly for a predefined number of times, which may equal to the spreading factor. For illustration and without limitation on the scope of the present disclosure, when spreading factor is three, encoded copies of the source symbols may be allocated to the shared time and frequency resources three times with either localized time repetition or localized frequency repetition.

In the example shown in FIG. 1, three copies of the twelve source symbols, s(1), s(2), s(3), s(4), s(5), s(6), s(7), s(8), s(9), s(10), s(11) and s(12), are first multiplied with a respective composite coding sequence corresponding to the UE to result in three copies of twelve complex symbols (denoted as x(1), x(2), x(3), x(4), x(5), x(6), x(7), x(8), x(9), x(10), x(11) and x(12) in FIG. 1). In this example, the length of each composite coding sequence is suitable for multiplying with thirty-six source symbols. Then, the complex symbols are allocated to the shared time and frequency resources with either localized time repetition or localized frequency repetition.

Referring to FIG. 1, with localized time repetition, the three copies of the twelve complex symbols may be allocated to the shared resources repeatedly in a way such that each of x(1), x(2), x(3), x(4), x(5), x(6), x(7), x(8), x(9), x(10), x(11) and x(12) is allocated to a respective frequency three times consecutively. In the example shown in FIG. 1, three copies of each of x(1) and x(2) are consecutively allocated to a first frequency, three copies of each of x(3) and x(4) are consecutively allocated to a second frequency, three copies of each of x(5) and x(6) are consecutively allocated to a third frequency, three copies of each of x(7) and x(8) are consecutively allocated to a fourth frequency, three copies of each of x(9) and x(10) are consecutively allocated to a fifth frequency, and three copies of each of x(11) and x(12) are consecutively allocated to a sixth frequency.

Also, as shown in FIG. 1, with localized frequency repetition, the three copies of the twelve complex symbols may be allocated to the shared resources repeatedly in a way such that each of x(1), x(2), x(3), x(4), x(5), x(6), x(7), x(8), x(9), x(10), x(11) and x(12) is allocated to a respective time slot three times consecutively. In the example shown in FIG. 1, three copies of each of x(1) and x(2) are consecutively allocated to a first time slot, three copies of each of x(3) and x(4) are consecutively allocated to a second time slot, three copies of each of x(5) and x(6) are consecutively allocated to a third time slot, three copies of each of x(7) and x(8) are consecutively allocated to a fourth time slot, three copies of each of x(9) and x(10) are consecutively allocated to a fifth time slot, and three copies of each of x(11) and x(12) are consecutively allocated to a sixth time slot.

Figure 2:
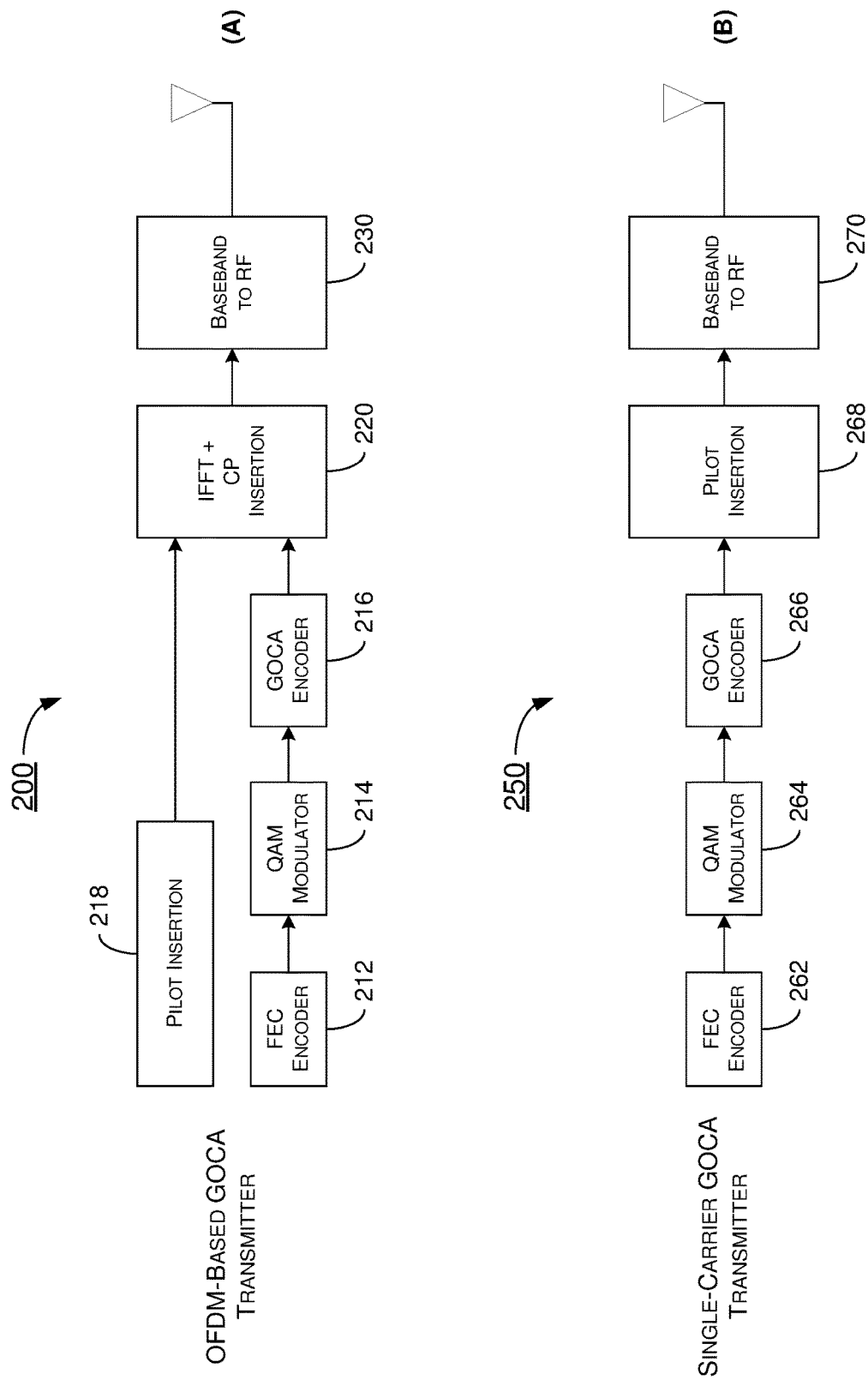
FIG. 2 is a block diagram of example system structures implementing the first example scheme.

FIG. 2 illustrates example system structures 200 and 250 implementing the example GOCA scheme 100. Structure 200 may represent functional blocks of an orthogonal frequency-division multiplexing (OFDM)-based GOCA transmitter of a UE in accordance with the present disclosure. Structure 250 may represent functional blocks of a single-carrier GOCA transmitter of a UE in accordance with the present disclosure.

Structure 200 may include a forward error correction (FEC) encoder 212, a quadrature amplitude modulation (QAM) modulator 214, a GOCA encoder 216, a pilot insertion module 218, an Inverse Fast Fourier Transformation (IFFT) plus cyclic prefix (CP) insertion module 220, and a baseband-to-radio frequency (RF) front end 230. GOCA encoder 216 may be configured to perform the two-stage sequence generation and resource allocation described above with respect to FIG. 1.

Structure 250 may include a FEC encoder 262, a QAM modulator 264, a GOCA encoder 266, a pilot insertion module 268, and a baseband-to-RF front end 270. GOCA encoder 266 may be configured to perform the two-stage sequence generation and resource allocation described above with respect to FIG. 1.

FIG. 3 illustrates an example RDMA scheme 300 in accordance with an implementation of the present disclosure.

Under the RDMA scheme 300, a UE may spread data into shared time and frequency resources according to a repetition pattern. Additionally or alternatively, for each repeated part of UE data, the data may pass through the same or different permutation function(s) and then be combined. In spreading the data (e.g., encoded source symbols or data pieces) into the shared resources using the repetition pattern, data pieces of the data (e.g., complex symbols) may first be allocated to a first portion of shared time and frequency resources, and a predefined number of copies or repetitions of the data pieces may be allocated to a second portion of the shared time and frequency resources.

Under the RDMA scheme 300, each repetition of the predefined number of repetitions may differ from the data pieces allocated to the first portion of the shared time and frequency resources by a respective amount of shift in time or frequency. Moreover, the respective amount of shift in time or frequency of a first repetition of the predefined number of repetitions for a given UE of multiple UEs may be different from the respective amount of shift in time or frequency of a first repetition of the predefined number of repetitions for at least one other UE of the multiple UEs. Likewise, the respective amount of shift in time or frequency of a second repetition of the predefined number of repetitions for the given UE may be different from the respective amount of shift in time or frequency of a second repetition of the predefined number of repetitions for at least one other UE of the multiple UEs. Advantageously, multi-user interference may be reduced while performance may be improved. To illustrate the point, a non-limiting example of the RDMA scheme 300 is shown in FIG. 3.

Referring to FIG. 3, each of three UEs (denoted as "UE 1", "UE 2" and "UE 3" in FIG. 3) may have twenty-seven complex symbols as data pieces to be spread into the shared time and frequency resources. For example, UE 1 may have data pieces $x_1(1)$-$x_1(27)$, UE 2 may have data pieces $x_2(1)$-$x_2(27)$, and UE 3 may have data pieces $x_3(1)$-$x_3(27)$. The predefined number of repetitions may equal a spreading factor of the encoding, which is three in the example shown in FIG. 3. Thus, three copies of the twenty-seven data pieces $x_1(1)$-$x_1(27)$ of UE 1 are allocated to ninety-one shared time and frequency resources with a cyclic-shift permutation performed on the first instance or the original copy of data pieces $x_1(1)$-$x_1(27)$ when allocating the first and second repetitions of the original copy of data pieces $x_1(1)$-$x_1(27)$.

In the example shown in FIG. 3, for UE 1, zero shift is performed on the original copy of data pieces $x_1(1)$-$x_1(27)$, a cyclic shift of three slots relative to the original copy is performed on the first repetition, and a cyclic shift of six slots relative to the original copy is performed on the second repetition. The cyclic-shift permutation for UE 1 is denoted as s1=(0, 3, 6). For ease of illustration, the first data piece $x_1(1)$ of the series of data pieces $x_1(1)$-$x_1(27)$ of UE 1 in each copy or repetition is highlighted to show that, for UE 1 in this example, the data pieces in the first repetition and the data pieces in the second repetition have a shift of three and six, respectively, relative to the original or first copy of the data pieces in the allocated shared resources. The resultant repetition pattern for UE 1 is used as the base pattern in this example, and the repetition pattern for UE 1 is denoted as p1=s1−s1=(0, 0, 0).

For UE 2, zero shift is performed on the original copy of data pieces $x_2(1)$-$x_2(27)$, a cyclic shift of four slots relative to the original copy is performed on the first repetition, and a cyclic shift of five slots relative to the original copy is performed on the second repetition. The cyclic-shift permutation for UE 2 is denoted as s2=(0, 4, 5). For ease of illustration, the first data piece $x_2(1)$ of the series of data pieces $x_2(1)$-$x_2(27)$ of UE 2 in each copy or repetition is highlighted to show that, for UE 2 in this example, the data pieces in the first repetition and the data pieces in the second repetition have a shift of four and five, respectively, relative to the original or first copy of the data pieces in the allocated shared resources. The repetition pattern for UE 2 is denoted as p2=s2−s1=(0, +1, −1). In other words, for UE 2, while there is zero shift for the first copy of its data pieces $x_2(1)$-$x_2(27)$ relative to the first copy of the data pieces $x_1(1)$-$x_1(27)$ of UE 1, there is a differential of +1 in the shift for the first repetition of the data pieces of UE 2 relative to the first repetition of the data pieces of UE 1. Moreover, there is a differential of −1 in the shift for the second repetition of the data pieces of UE 2 relative to the second repetition of the data pieces of UE 1.

For UE 3, zero shift is performed on the original copy of data pieces $x_3(1)$-$x_3(27)$, a cyclic shift of two slots relative to the original copy is performed on the first repetition, and a cyclic shift of seven slots relative to the original copy is performed on the second repetition. The cyclic-shift permutation for UE 3 is denoted as s3=(0, 2, 7). For ease of illustration, the first data piece $x_2(1)$ of the series of data pieces $x_2(1)$-$x_2(27)$ of UE 2 in each copy or repetition is highlighted to show that, for UE 2 in this example, the data pieces in the first repetition and the data pieces in the second repetition have a shift of two and seven, respectively, relative to the original or first copy of the data pieces in the allocated shared resources. The repetition pattern for UE 3 is denoted as p3=s3−s1=(0, −1, +1). In other words, for UE 3, while there is zero shift for the first copy of its data pieces $x_3(1)$-$x_3(27)$ relative to the first copy of the data pieces $x_1(1)$-$x_1(27)$ of UE 1, there is a differential of −1 in the shift for the first repetition of the data pieces of UE 3 relative to the first repetition of the data pieces of UE 1. Moreover, there is a differential of +1 in the shift for the second repetition of the data pieces of UE 3 relative to the second repetition of the data pieces of UE 1.

In general, under the RDMA scheme 300, the spreading of the data into the shared resources using the repetition pattern of the data pieces of the data may involve permutating the repetition pattern according to Equation (1) expressed below.

$$d_{ik} = P_i - P_k = [d_{ik}(0), d_{ik}(1), \ldots, d_{ik}(M_{rep}-1)]^T,$$

$$d_{ik}(m) \neq d_{ik}(m') \text{ if } m \neq m', \quad (1)$$

In Equation (1) above, $M_{rep}$ is a number of permutations of the repetition pattern when there are L possible positions to choose from for a permutation and $L^{M_{rep}}$ possible sequences for $M_{rep}$ permutations for $N_{ue}$ sequences to be drawn from the $L^{M_{rep}}$ sequences for $N_{ue}$ UEs. Additionally, in Equation (1), $P_i$ denotes a repetition pattern for an $i^{th}$ UE, $P_k$ denotes repetition pattern for a $k^{th}$ UE, and $d_{ik}(m)$ denotes a difference between an amount of shift in time or frequency of an $m^{th}$ repetition of $P_i$ and an amount of shift in time or frequency of an $m^{th}$ repetition of $P_k$, with $1 < m \leq M_{rep}$.

FIG. 4 illustrates a non-limiting example 400 of repetition patterns produced by Equation (1) and following the above described design principle. Example 400 shows possible repetition patterns under the RDMA scheme 300 of two-time repetition (denoted as "RDMA pattern of 2× repetition"), three-time repetition (denoted as "RDMA pattern of 3× repetition"), and four-time repetition (denoted as "RDMA pattern of 4× repetition"). It is noteworthy that it is preferable that the absolute value of each element in a repetition pattern is as small as possible for better utilization of diversity.

Figure 5:
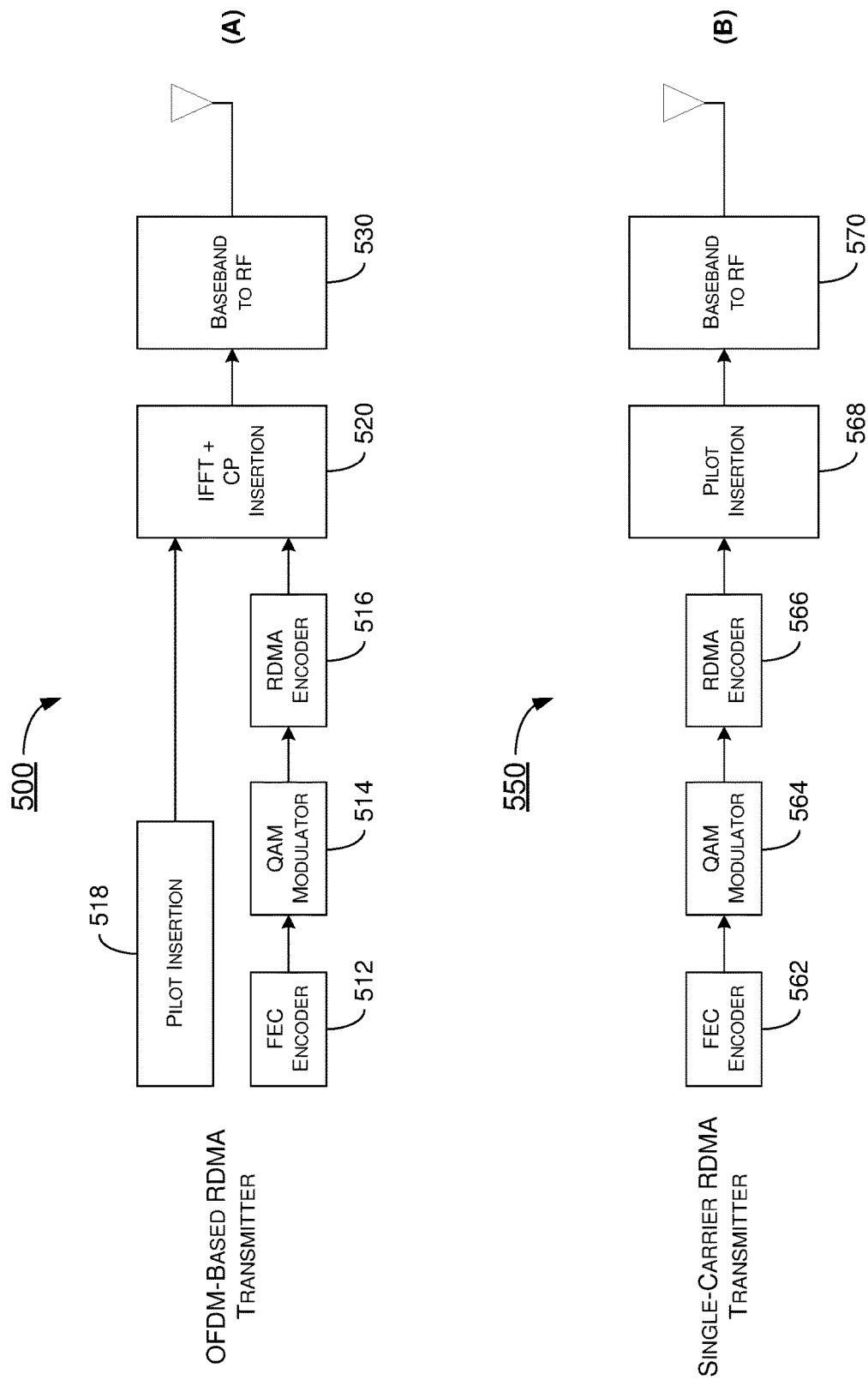
FIG. 5 is a block diagram of example system structures implementing the second example scheme.

FIG. 5 illustrates example system structures 500 and 550 implementing the example RDMA scheme 300. Structure 500 may represent functional blocks of an OFDM-based RDMA transmitter of a UE in accordance with the present disclosure. Structure 550 may represent functional blocks of a single-carrier RDMA transmitter of a UE in accordance with the present disclosure.

Structure 500 may include a FEC encoder 512, a QAM modulator 514, a RDMA encoder 516, a pilot insertion module 518, an IFFT plus CP insertion module 520, and a baseband-to-RF front end 530. RDMA encoder 516 may be configured to perform the permutations described above with respect to FIG. 3.

Structure 550 may include a FEC encoder 562, a QAM modulator 564, a RDMA encoder 566, a pilot insertion module 568, and a baseband-to-RF front end 570. RDMA encoder 566 may be configured to perform the permutations described above with respect to FIG. 3.

Figure 6:
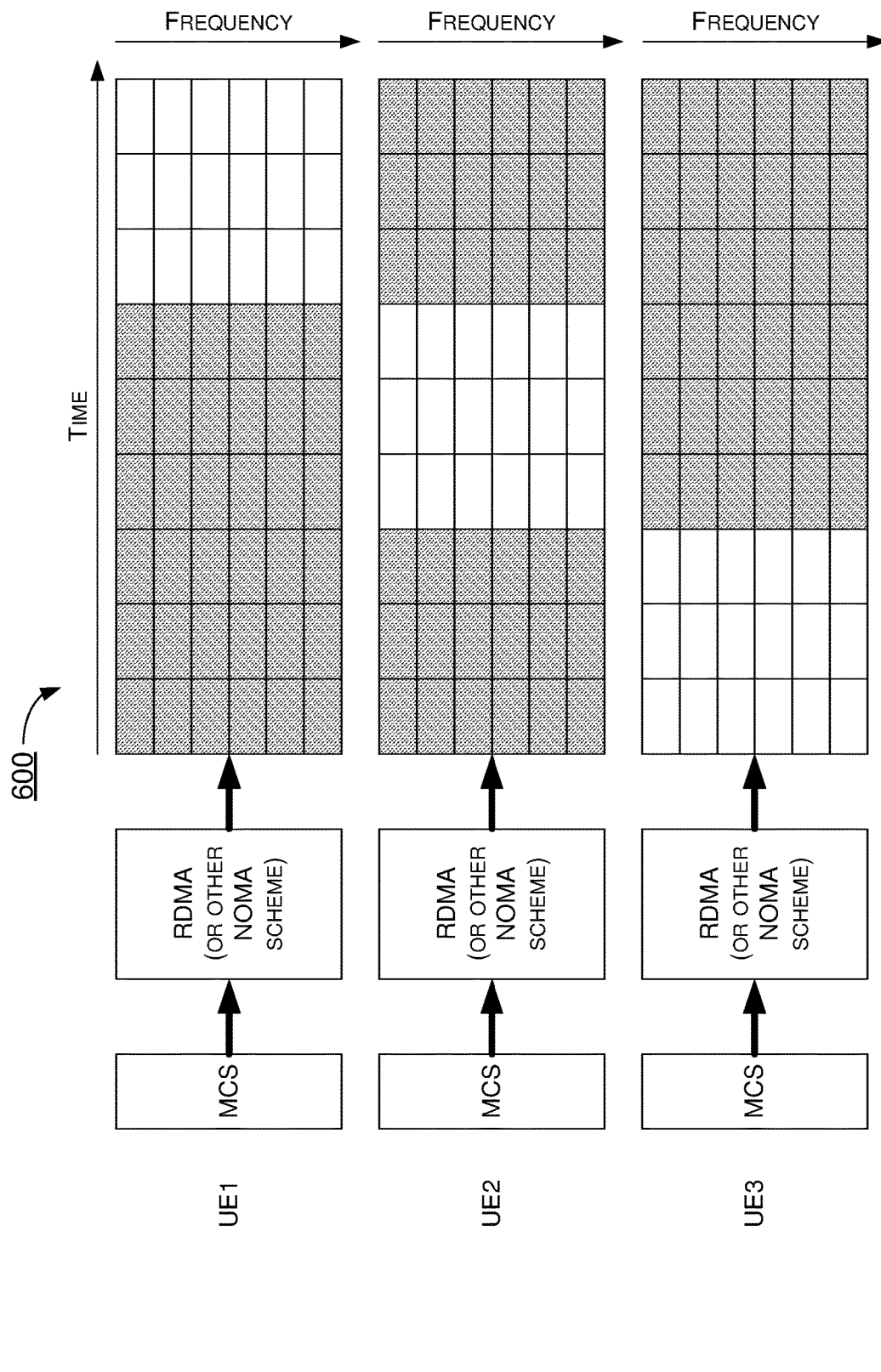
FIG. 6 is a diagram of a third example scheme in accordance with an implementation of the present disclosure.

FIG. 6 illustrates an example LDS scheme 600 in accordance with an implementation of the present disclosure.

Under the LDS scheme 600, a UE may use a part of shared time and frequency resources according to an LDS pattern, rather than using the entire shared time and frequency resources. Moreover, the LDS pattern, which includes used resources or shared resources to which data pieces or complex symbols have been allocated, may be centralized or distributed. For instance, the LDS pattern may be centralized within one or more portions of the entire pattern of the shared resources. Alternatively, the LDS pattern may be distributed across the entire pattern of the shared resources. Advantageously, multi-user interference may be reduced while performance may be improved.

Under the LDS scheme 600, when data is encoded by spreading data pieces of the data into shared resources using the LDS pattern, the data may be processed using a NOMA scheme in spreading the data into the shared resources using the LDS pattern. For example, the GOCA scheme 100 and the RDMA scheme 300 described above, as well as other NOMA schemes (e.g., RSMA, IDMA and sparse code multiple access (SCMA)), may be utilized in spreading the data into the shared time and frequency resources. For instance, data may be spread into the shared resources using a repetition pattern of the data pieces of the data under the RDMA scheme 300.

Referring to FIG. 6, for each UE such as UE 1, UE 2 and UE 3, the process of MCS may produce a number of source symbols for encoding into a corresponding number of complex symbols. The complex symbols may then be spread into shared time and frequency resources under the LDS scheme 300 following processing by a NOMA scheme (e.g., the RDMA scheme 300). In the example shown in FIG. 6, for UE 1, the data pieces may be spread into ⅔ of the shared resources towards the left side of the time-frequency diagram. For UE 2, the data pieces may be spread into ⅔ of the shared resources in a distributed fashion across the shared resources, such as on the two ends of the time-frequency diagram. For UE 3, the data pieces may be spread into ⅔ of the shared resources towards the right side of the time-frequency diagram. It is noteworthy that there are other possible ways to spread the data pieces into some but not all of the shared resources. Thus, the scope of the LDS scheme 600 in accordance with the present disclosure is not limited to that shown in FIG. 6.

Illustrative Implementations

Figure 7:
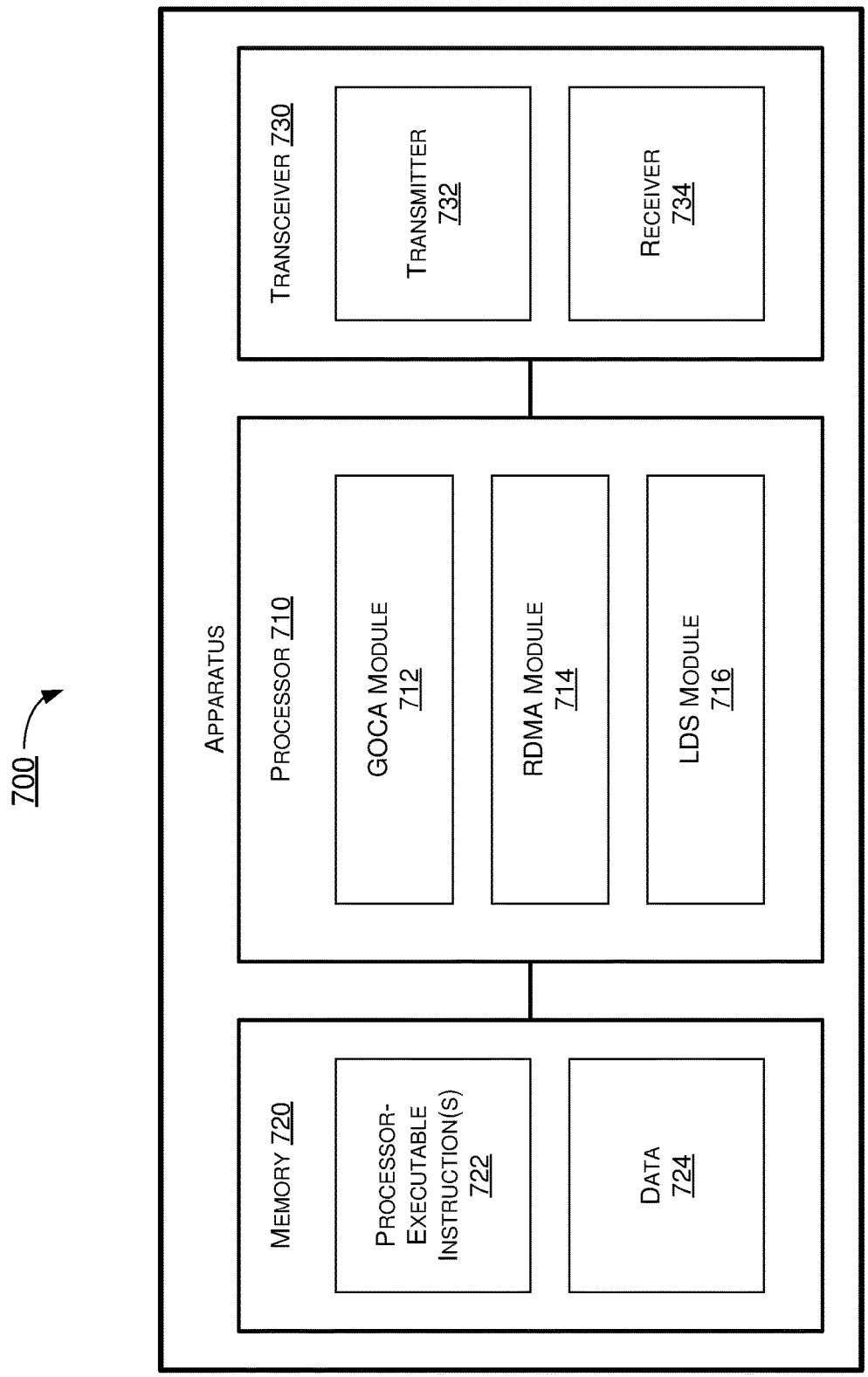
FIG. 7 is a block diagram of an example apparatus in accordance with an implementation of the present disclosure.

FIG. 7 illustrates an example apparatus 700 in accordance with an implementation of the present disclosure. Apparatus 700 may perform various functions to implement schemes, techniques, processes and methods described herein pertaining to non-orthogonal multiple access for wireless communications, including the various schemes and structures described above with respect to FIG. 1-FIG. 6 as well as processes 800, 900 and 1000 described below.

Apparatus 700 may be a part of an electronic apparatus, which may be a UE such as a portable or mobile apparatus, a wearable apparatus, a wireless communication apparatus or a computing apparatus. For instance, apparatus 700 may be implemented in or as a smartphone, a smartwatch, a personal digital assistant, a digital camera, or a computing equipment such as a tablet computer, a laptop computer or a notebook computer. Apparatus 700 may also be a part of a machine type apparatus, which may be an Internet-of-Things (IoT) apparatus such as an immobile or a stationary apparatus, a home apparatus, a wire communication apparatus or a computing apparatus. For instance, apparatus 700 may be implemented in a smart thermostat, a smart fridge, a smart door lock, a wireless speaker or a home control center. Alternatively, apparatus 700 may be implemented in the form of one or more integrated-circuit (IC) chips such as, for example and without limitation, one or more single-core processors, one or more multi-core processors, or one or more complex-instruction-set-computing (CISC) processors. Apparatus 700 may include at least some of those components shown in FIG. 7 such as a processor 710, for example. Apparatus 700 may further include one or more other components not pertinent to the proposed scheme of the present disclosure (e.g., internal power supply, display device and/or user interface device), and, thus, such component(s) of apparatus 700 are neither shown in FIG. 7 nor described below in the interest of simplicity and brevity.

In one aspect, processor 710 may be implemented in the form of one or more single-core processors, one or more multi-core processors, or one or more CISC processors. That is, even though a singular term "a processor" is used herein to refer to processor 710, processor 710 may include multiple processors in some implementations and a single processor in other implementations in accordance with the present disclosure. In another aspect, processor 710 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 710 is a special-purpose machine with circuitry specifically designed, arranged and configured to perform specific tasks pertaining to non-orthogonal multiple access for wireless communications between a user equipment (e.g., apparatus 700) and a network in accordance with various implementations of the present disclosure.

In some implementations, apparatus 700 may also include a transceiver 730 coupled to processor 710 and capable of wirelessly transmitting and receiving data. Accordingly, apparatus 700 may wirelessly communicate with a wireless network (e.g., a LTE network, a LTE-Advanced network, a $5^{th}$-Generation (5G) network, a New Radio (NR) network, a Wi-Fi network or a wireless network of a different radio access technology) or one or more other UEs via transceiver 730. Transceiver 730 may include a transmitter 732 and a receiver 734. Transmitter 732 may include circuits configured as functional blocks similar to one or more of the transmitters shown in FIG. 2 and FIG. 5. For instance, transmitter 732 may include hardware and software components for transmitter 732 to function as an OFDM-based GOCA transmitter, a single-carrier GOCA transmitter, an OFDM-based RDMA transmitter and/or a single-carrier RDMA transmitter.

In some implementations, apparatus 700 may further include a memory 720 coupled to processor 710 and capable of being accessed by processor 710 and storing data therein. Memory 720 may include a type of random-access memory (RAM) such as dynamic RAM (DRAM), static RAM (SRAM), thyristor RAM (T-RAM) and/or zero-capacitor RAM (Z-RAM). Alternatively or additionally, memory 720 may include a type of read-only memory (ROM) such as mask ROM, programmable ROM (PROM), erasable programmable ROM (EPROM) and/or electrically erasable programmable ROM (EEPROM). Alternatively or additionally, memory 720 may include a type of non-volatile random-access memory (NVRAM) such as flash memory, solid-state memory, ferroelectric RAM (FeRAM), magnetoresistive RAM (MRAM) and/or phase-change memory. Memory 720 may store therein one or more sets of processor-executable instructions the execution of which by processor 710 may cause processor 710 to carry out various functions and operations pertaining to NOMA for wireless communications in accordance with the present disclosure. Memory 720 may also store therein data 724 such as data pieces, source symbols, complex symbols, coding sequences and/or composite coding sequences described herein.

In the interest of brevity and to avoid repetition, detailed description of the capabilities and functions of apparatus 700 is provided below with respect to processes 800, 900 and 1000.

Figure 8:
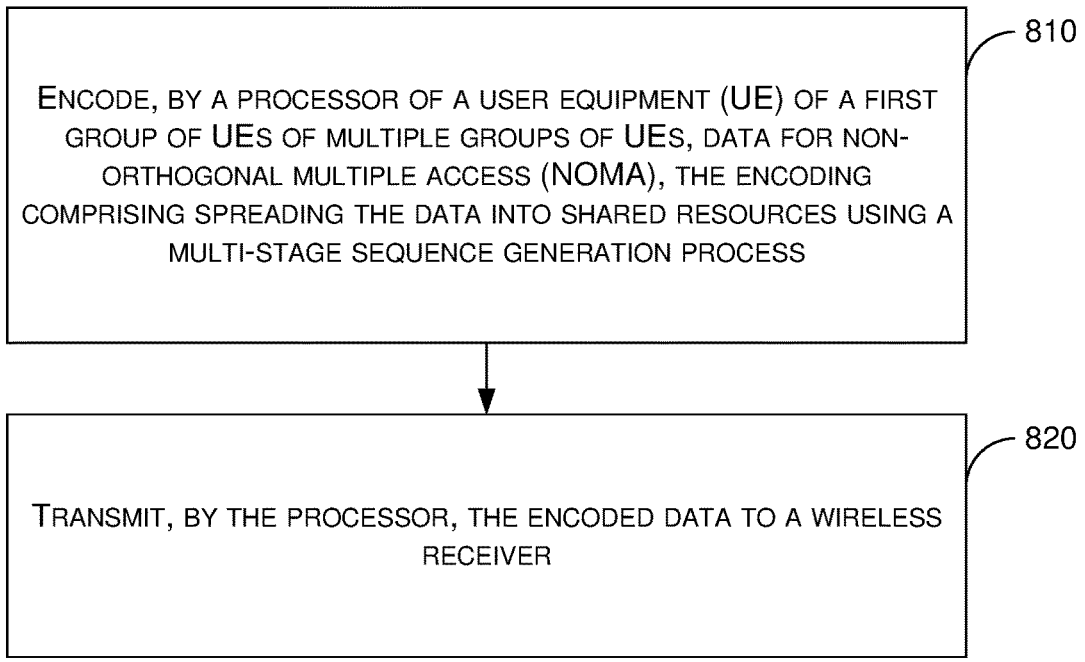
FIG. 8 is a flowchart of an example process in accordance with an implementation of the present disclosure.

FIG. 8 illustrates an example process 800 in accordance with an implementation of the present disclosure. Process 800 may represent an aspect of implementing the proposed concepts and schemes such as one or more of the various schemes described above pertaining to NOMA for wireless communications. More specifically, process 800 may represent an example implementation of the GOCA scheme 100. Process 800 may include one or more operations, actions, or functions as illustrated by one or more of blocks 810 and 820. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. The blocks/sub-blocks of process 800 may be executed iteratively. Process 800 may be implemented by or in apparatus 700 as well as any variations thereof. Solely for illustrative purposes and without limiting the scope, process 800 is described below in the context of apparatus 700 implemented as an UE among a first group of UEs of multiple groups of UEs in a wireless network. Process 800 may begin at block 810.

At 810, process 800 may involve processor 710 of apparatus 700 encoding data for NOMA. In encoding the data, process 800 may involve processor 710 spreading the data into shared resources using a multi-stage sequence generation process. Process 800 may proceed from 810 to 820.

At 820, process 800 may involve processor 710 transmitting, via transceiver 730, the encoded data to a wireless receiver (e.g., a wireless receiver of a network or another UE).

In some implementations, in spreading the data into shared resources using the multi-stage sequence generation process, process 800 may involve processor 710 performing a number of operations. For instance, process 800 may involve processor 710 generating an orthogonal coding sequence for a first stage of the multi-stage sequence generation process. Additionally, process 800 may involve processor 710, for at least a second sequence of one or more subsequent stages of the multi-stage sequence generation process, generating a non-orthogonal coding sequence. Moreover, process 800 may involve processor 710 generating a composite coding sequence by multiplying the orthogonal coding sequence and the non-orthogonal coding sequence. Furthermore, process 800 may involve processor 710 generating a plurality of complex symbols for the data by multiplying a predefined number of copies of a plurality of source symbols of the data and the composite coding sequence. Additionally, process 800 may involve processor 710 allocating the plurality of complex symbols to shared time and frequency resources.

In some implementations, the orthogonal coding sequence may be different from another orthogonal coding sequence used by another UE of the first group of UEs.

In some implementations, the non-orthogonal coding sequence may be different from another non-orthogonal coding sequence used by another UE of a second group of UEs of the multiple groups of UEs.

In some implementations, in allocating the plurality of complex symbols to the shared time and frequency resources, process 800 may involve processor 710 allocating the plurality of complex symbols to the shared time and frequency resources with localized time repetition, and wherein the plurality of complex symbols are allocated to the shared time and frequency resources repeatedly in a way such that each complex symbol of the plurality of complex symbols is consecutively allocated to a respective frequency for the predefined number of times.

In some implementations, in allocating the plurality of complex symbols to the shared time and frequency resources, process 800 may involve processor 710 allocating the plurality of complex symbols to the shared time and frequency resources with localized frequency repetition, and wherein the plurality of complex symbols are allocated to the shared time and frequency resources repeatedly in a way such that each complex symbol of the plurality of complex symbols is consecutively allocated to a respective time slot for the predefined number of times.

Figure 9:
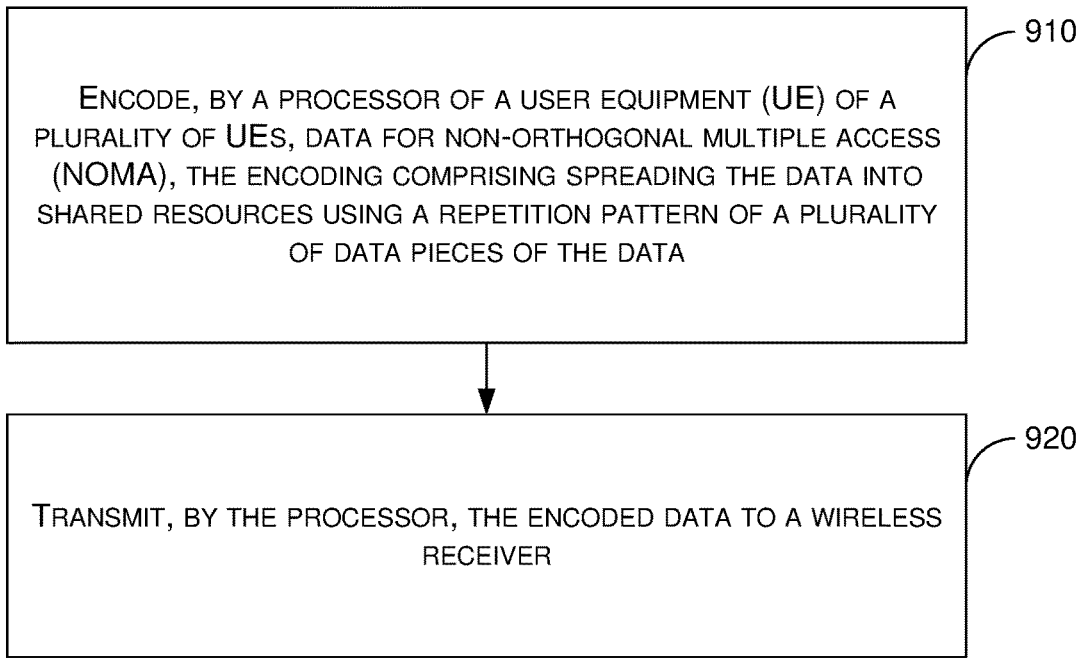
FIG. 9 is a flowchart of an example process in accordance with an implementation of the present disclosure.

FIG. 9 illustrates an example process 900 in accordance with an implementation of the present disclosure. Process 900 may represent an aspect of implementing the proposed concepts and schemes such as one or more of the various schemes described above pertaining to NOMA for wireless communications. More specifically, process 900 may represent an example implementation of the RDMA scheme 300. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. The blocks/sub-blocks of process 900 may be executed iteratively. Process 900 may be implemented by or in apparatus 700 as well as any variations thereof. Solely for illustrative purposes and without limiting the scope, process 900 is described below in the context of apparatus 700 implemented as an UE among a plurality of UEs in a wireless network. Process 900 may begin at block 910.

At 910, process 900 may involve processor 710 of apparatus 700 encoding data for NOMA. In encoding the data, process 900 may involve processor 710 spreading the data into shared resources using a repetition pattern of a plurality of data pieces of the data. Process 900 may proceed from 910 to 920.

At 920, process 900 may involve processor 710 transmitting, via transceiver 730, the encoded data to a wireless receiver (e.g., a wireless receiver of a network or another UE).

In some implementations, in spreading the data into the shared resources using the repetition pattern of the plurality of data pieces of the data, process 900 may involve processor 710 allocating the plurality of data pieces of the data to a first portion of shared time and frequency resources. Additionally, process 900 may involve processor 710 allocating a predefined number of repetitions of the plurality of data pieces of the data to a second portion of the shared time and frequency resources. Each repetition of the predefined number of repetitions may differ from the data pieces allocated to the first portion of the shared time and frequency resources by a respective amount of shift in time or frequency. The respective amount of shift in time or frequency of a first repetition of the predefined number of repetitions for the UE may be different from the respective amount of shift in time or frequency of a first repetition of the predefined number of repetitions for at least one other UE of the plurality of UEs.

In some implementations, the predefined number may equal a spreading factor of the encoding.

In some implementations, in spreading the data into the shared resources using the repetition pattern of the plurality of data pieces of the data, process 900 may involve processor 710 permutating the repetition pattern according to an equation as follows: $d_{ik}=P_i-P_k=[d_{ik}(0), d_{ik}(1), \ldots, d_{ik}(M_{rep}-1)]^T$, where $d_{ik}(m) \neq d_{ik}(m')$ if $m \neq m'$.

Here, $M_{rep}$ denotes a number of permutations of the repetition pattern when there are L possible positions to choose from for a permutation and $L^{M_{rep}}$ possible sequences for $M_{rep}$ permutations for $N_{ue}$ sequences to be drawn from the $L^{M_{rep}}$ sequences for $N_{ue}$ UEs. Moreover, $P_i$ denotes a repetition pattern for an $i^{th}$ UE, $P_k$ denotes repetition pattern for a $k^{th}$ UE, and $d_{ik}(m)$ denotes a difference between an amount of shift in time or frequency of an $m^{th}$ repetition of $P_i$ and an amount of shift in time or frequency of an $m^{th}$ repetition of $P_k$, with $1<m<M_{rep}$.

In some implementations, in spreading the data into the shared resources using the repetition pattern of the plurality of data pieces of the data, process 900 may involve processor 710 performing a same permutation or different permutations on each of the data pieces in one or more repetitions. Moreover, process 900 may involve processor 710 combining the permuted data pieces to generate the encoded data.

Figure 10:
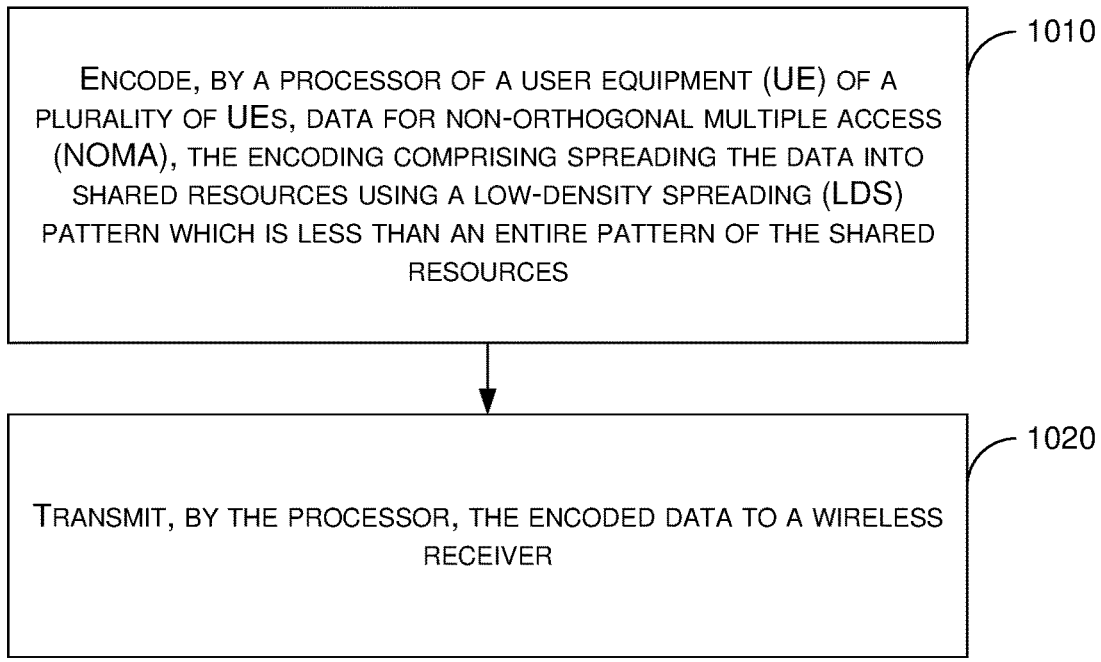
FIG. 10 is a flowchart of an example process in accordance with an implementation of the present disclosure.
Figure 11:
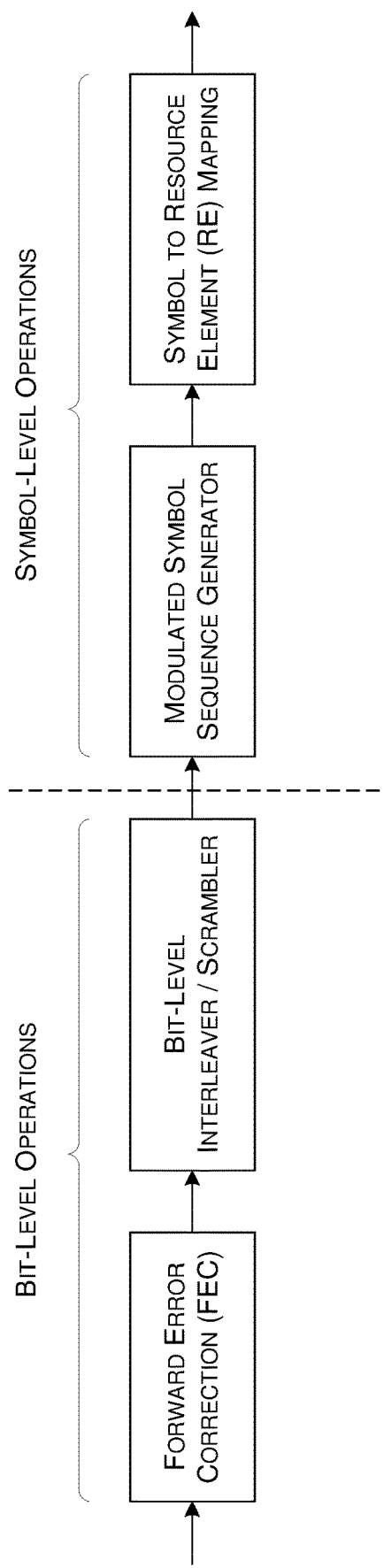
FIG. 11 is a diagram of functional blocks for uplink transmission according to existing proposed NOMA schemes.

FIG. 10 illustrates an example process 1000 in accordance with an implementation of the present disclosure. Process 1000 may represent an aspect of implementing the proposed concepts and schemes such as one or more of the various schemes described above pertaining to NOMA for wireless communications. More specifically, process 1000 may represent an example implementation of the LDS scheme 600. Process 1000 may include one or more operations, actions, or functions as illustrated by one or more of blocks 1010 and 1020. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. The blocks/sub-blocks of process 1000 may be executed iteratively. Process 1000 may be implemented by or in apparatus 700 as well as any variations thereof. Solely for illustrative purposes and without limiting the scope, process 1000 is described below in the context of apparatus 700 implemented as an UE among a plurality of UEs in a wireless network. Process 1000 may begin at block 1010.

At 1010, process 1000 may involve processor 710 of apparatus 700 encoding data for NOMA. In encoding the data, process 1000 may involve processor 710 spreading the data into shared resources using a low-density spreading (LDS) pattern which is less than an entire pattern of the shared resources. Process 1000 may proceed from 1010 to 1020.

At 1020, process 1000 may involve processor 710 transmitting, via transceiver 730, the encoded data to a wireless receiver (e.g., a wireless receiver of a network or another UE).

In some implementations, the LDS pattern may be centralized within one or more portions of the entire pattern of the shared resources. Alternatively, the LDS pattern may be distributed across the entire pattern of the shared resources.

In some implementations, in encoding the data, process 1000 may further involve processor 710 processing the data using a NOMA scheme in spreading the data into the shared resources with the LDS pattern.

In some implementations, in processing the data using the NOMA scheme in spreading the data into the shared resources with the LDS pattern, process 1000 may involve processor 710 processing the data using a repetition division multiple access (RDMA) scheme in spreading the data into the shared resources using the LDS pattern. In using the RDMA scheme, process 1000 may involve processor 710 spreading the data into the shared resources using a repetition pattern of a plurality of data pieces of the data.

In some implementations, in spreading the data into the shared resources using the repetition pattern of the plurality of data pieces of the data, process 900 may involve processor 710 allocating the plurality of data pieces of the data to a first portion of shared time and frequency resources. Additionally, process 900 may involve processor 710 allocating a predefined number of repetitions of the plurality of data pieces of the data to a second portion of the shared time and frequency resources. Each repetition of the predefined number of repetitions may differ from the data pieces allocated to the first portion of the shared time and frequency resources by a respective amount of shift in time or frequency. The respective amount of shift in time or frequency of a first repetition of the predefined number of repetitions for the UE may be different from the respective amount of shift in time or frequency of a first repetition of the predefined number of repetitions for at least one other UE of the plurality of UEs.

In some implementations, the predefined number may equal a spreading factor of the encoding.

In some implementations, in spreading the data into the shared resources using the repetition pattern of the plurality of data pieces of the data, process 900 may involve processor 710 permutating the repetition pattern according to an equation as follows: $d_{ik} \equiv P_i - P_k = [d_{ik}(0), d_{ik}(1), \ldots, d_{ik}(M_{rep}-1)]^T$, where $d_{ik}(m) \neq d_{ik}(m')$ if $m \neq m'$.

Here, $M_{rep}$ denotes a number of permutations of the repetition pattern when there are L possible positions to choose from for a permutation and $L^{M_{rep}}$ possible sequences for $M_{rep}$ permutations for $N_{ue}$ sequences to be drawn from the $L^{M_{rep}}$ sequences for $N_{ue}$ UEs. Moreover, $P_i$ denotes a repetition pattern for an $i^{th}$ UE, $P_k$ denotes repetition pattern for a $k^{th}$ UE, and $d_{ik}(m)$ denotes a difference between an amount of shift in time or frequency of an $m^{th}$ repetition of $P_i$ and an amount of shift in time or frequency of an $m^{th}$ repetition of $P_k$, with $1 < m < M_{rep}$.

In some implementations, in spreading the data into the shared resources using the repetition pattern of the plurality of data pieces of the data, process 900 may involve processor 710 performing a same permutation or different permutations on each of the data pieces in one or more repetitions. Moreover, process 900 may involve processor 710 combining the permutated data pieces to generate the encoded data.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   encoding, by a processor of a user equipment (UE) of a plurality of UEs, data for non-orthogonal multiple access (NOMA), the encoding comprising spreading the data into shared resources using a repetition pattern of a plurality of data pieces of the data and with a respective cyclic-shift permutation for each of the plurality of UEs that differs from one UE to another UE of the plurality of UEs; and
   transmitting, by the processor, the encoded data to a wireless receiver,
   wherein the spreading of the data into the shared resources using the repetition pattern of the plurality of data pieces of the data comprises:
      allocating the plurality of data pieces of the data to a first portion of shared time and frequency resources; and
      allocating a predefined number of repetitions of the plurality of data pieces of the data to a second portion of the shared time and frequency resources,
   wherein each repetition of the predefined number of repetitions differs from the data pieces allocated to the first portion of the shared time and frequency resources by a respective amount of shift in time or frequency,
   wherein the respective amount of shift in time or frequency of a first repetition of the predefined number of repetitions for the UE is different from the respective amount of shift in time or frequency of a first repetition of the predefined number of repetitions for at least one other UE of the plurality of UEs,
   wherein a respective first cyclic shift for the first repetition of the predefined number of repetitions for the UE being different from a respective first cyclic shift for the first repetition of the predefined number of repetitions for each of other UEs of the plurality of UEs, and
   wherein a respective second cyclic shift for a second repetition of the predefined number of repetitions for the UE being different from a respective second cyclic shift for a second repetition of the predefined number of repetitions for each of other UEs of the plurality of UEs.

2. The method of claim 1, wherein the predefined number equals a spreading factor of the encoding.

3. A method, comprising:
   encoding, by a processor of a user equipment (UE) of a plurality of UEs, data for non-orthogonal multiple access (NOMA), the encoding comprising spreading the data into shared resources using a repetition pattern of a plurality of data pieces of the data; and
   transmitting, by the processor, the encoded data to a wireless receiver,
   wherein the spreading of the data into the shared resources using the repetition pattern of the plurality of data pieces of the data comprises permutating the repetition pattern according to an equation as follows:

$$d_{ik} = P_i - P_k = [d_{ik}(0), d_{ik}(1), \ldots, d_{ik}(M_{rep}-1)]^T,$$

$$d_{ik}(m) \neq d_{ik}(m') \text{ if } m \neq m',$$

wherein:
   $M_{rep}$ denotes a number of permutations of the repetition pattern when there are L possible positions to choose from for a permutation and $L^{M_{rep}}$ possible sequences for $M_{rep}$ permutations for $N_{ue}$ sequences to be drawn from the $L^{M_{rep}}$ sequences for $N_{ue}$ UEs,
   $P_i$ denotes a repetition pattern for an $i^{th}$ UE,
   $P_k$ denotes repetition pattern for a $k^{th}$ UE,
   $d_{ik}(m)$ denotes a difference between an amount of shift in time or frequency of an $m^{th}$ repetition of $P_i$ and an amount of shift in time or frequency of an $m^{th}$ repetition of $P_k$, and
   $1 < m < M_{rep}$.

4. A method, comprising:
   encoding, by a processor of a user equipment (UE) of a plurality of UEs, data for non-orthogonal multiple access (NOMA), the encoding comprising spreading the data into shared resources using a repetition pattern of a plurality of data pieces of the data and with a respective cyclic-shift permutation for each of the plurality of UEs that differs from one UE to another UE of the plurality of UEs; and
   transmitting, by the processor, the encoded data to a wireless receiver, wherein a respective amount of shift in time or frequency of a first repetition of a predefined number of repetitions for the UE is different from a respective amount of shift in time or frequency of a first repetition of the predefined number of repetitions for at least one other UE of the plurality of UEs, wherein a respective first cyclic shift for the first repetition of the predefined number of repetitions for the UE being different from a respective first cyclic shift for the first repetition of the predefined number of repetitions for each of other UEs of the plurality of UEs, and wherein a respective second cyclic shift for a second repetition of the predefined number of repetitions for the UE being different from a respective second cyclic shift for a second repetition of the predefined number of repetitions for each of other UEs of the plurality of UEs.

* * * * *